United States Patent [19]

Freundlich

[11] Patent Number: 4,670,840

[45] Date of Patent: Jun. 2, 1987

[54] RING ARTIFACT CORRECTION FOR COMPUTERIZED TOMOGRAPHY

[75] Inventor: David A. Freundlich, Haifa, Israel

[73] Assignee: Elscint, Inc., Chicago, Ill.

[21] Appl. No.: 843,836

[22] Filed: Mar. 26, 1986

Related U.S. Application Data

[63] Continuation of Ser. No. 473,617, Mar. 9, 1983, abandoned.

[51] Int. Cl.⁴ ............................................. G06F 15/42
[52] U.S. Cl. ...................................... 364/414; 378/4; 378/901
[58] Field of Search ............................. 364/413–414; 358/111; 378/4, 21, 58, 98–99, 901

[56] References Cited

U.S. PATENT DOCUMENTS

| | | | |
|---|---|---|---|
| 4,217,641 | 8/1980 | Naparstek | 364/414 |
| 4,233,662 | 11/1980 | Le May | 364/414 |
| 4,272,820 | 6/1981 | Lux | 364/414 |
| 4,295,195 | 10/1981 | Hounsfield | 364/414 |
| 4,399,457 | 8/1983 | Riederer et al. | 358/111 |
| 4,415,980 | 11/1983 | Buchanan | 364/414 X |
| 4,437,161 | 3/1984 | Anderson | 364/414 |
| 4,450,478 | 5/1984 | Ledley | 358/111 |

OTHER PUBLICATIONS

*Suppression of Ring Artifacts In CT Fan–Beam Scanners* (IEEE Transactions on Nuclear Science, vol. NS-25, No. 5, Oct. 1978 by G. Kowalski—pp. 1111-1116).

*Primary Examiner*—Gary V. Harkcom
*Attorney, Agent, or Firm*—Sandler & Greenblum

[57] ABSTRACT

A method for the correction of ring artifacts in images obtained by rotate-rotate computerized tomography (CT) scanners includes the step of reconstructing an original image, which comprises a real image and a ring artifact image. The ring artifact image is determined by edge enhancing the original image and dividing the edge enhanced original image into rings or annuli with the annuli being concentric around the axis of rotation. The average intensity is determined for each concentric annulus. This average value of each annulus is substracted from pixels of the original image belonging to that annulus to provide a ring artifact free image.

11 Claims, 1 Drawing Figure

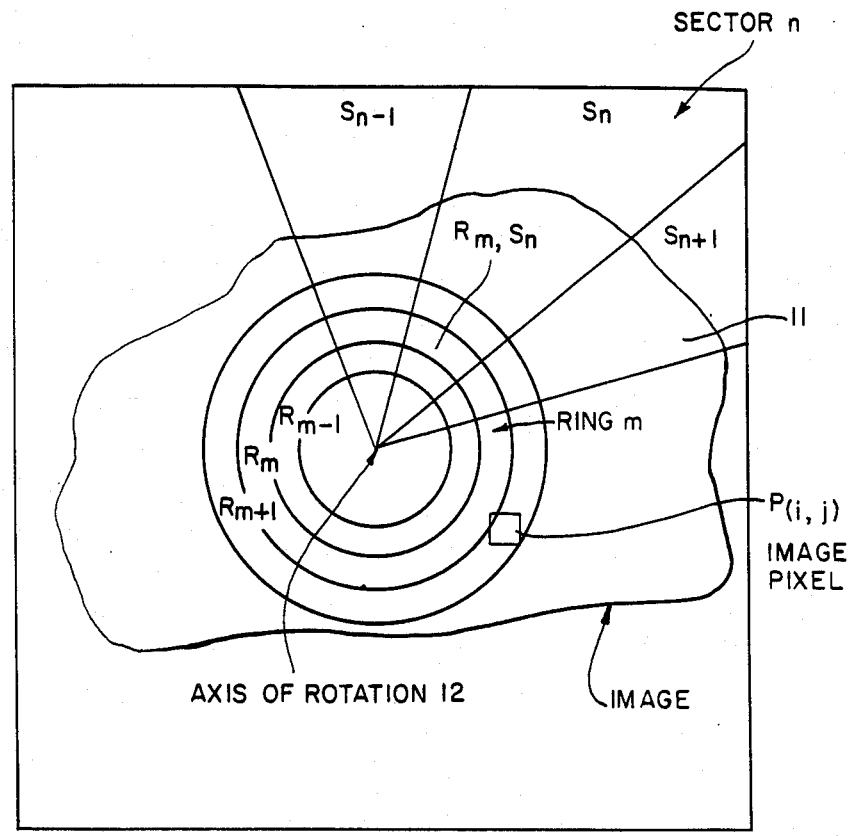

RING ARTIFACT CORRECTION FOR COMPUTERIZED TOMOGRAPHY

This application is a continuation of application Ser. No. 473,617, filed Mar. 9, 1983, now abandoned.

FIELD OF THE INVENTION

The present invention is concerned with computed tomography and more particularly with methods for correcting for ring artifacts in images derived by rotate-rotate computerized tomography (CT) Scanners.

BACKGROUND OF THE INVENTION

A goal of CT designers is to obtain rapid scanning with improved resolution and contrast discrimination in order to obtain clear understandable images substantially free of artifacts. The rapidity of obtaining images is important for minimizing artifacts caused by the movement of the patient or the movement of the patient's organs during the scan. Other advantages of shortened time are less patient inconvenience and increased patient throughput.

The early CT equipment used a single beam operating in translate-rotate motion. The X-ray tube and the detectors were arranged a fixed distance from each other at opposite sides of the patient. The detected x-ray beam intensity was recorded as the beam translated across the patient at a single angular position. The angular position was changed and the beam was again translated across the patient. This operation was repeated a number of times. Obviously with this method it took a relatively long time to complete each scan (approximately 5 minutes). The time was shortened appreciably, to approximately 10 seconds, by using multiple detectors in a fan beam.

The next step in the development of computed tomography was to eliminate the translation motion during scanning. This was accomplished by using a relatively wide arrays of detectors in a fan beam of x-rays that covered the width of the scanned object. Both the radiation source and the detectors were rotated (Rotate-Rotate or R/R CT Scanner). The resulting scan time was cut to a period of 2 to 10 seconds.

Although a rotation of only 180 degrees (plus the fan beam angle) are needed to obtain sufficient data for reconstruction, the R/R scanners generally rotate through 360 degrees or more per scan to compensate for divergence of the beam in direction perpendicular to the fan beam so as to enable the use of a small size radiation source and none-the-less obtain more uniform thickness in the resulting section of the patient. The reduced size radiation source also provides a more sharply collimated beam and consequently reduces radiation dosage. In addition, the 360 degree rotation reduces skin dosage.

Since the inception of R/R type CT scanners, however, the image has been plagued by ring artifacts caused by inbalances between detector elements. The designers of the scanners using the R/R systems have resorted to many different complicated systems to eliminate or at least minimize the occurence of ring artifacts. (See the paper entitled "Suppression of Ring Artifacts in CT Fan-Beam Scanners" by G. Kowalski published in IEEE Transactions on Nuclear Science, Vol. NS-25, No. 5, October 1978; and U.S. Pat. No. 4,323,784).

Among the prior art solutions of the ring artifact problems are the use of special matched detector arrays for example, the use of matched gaseous ionization detectors with circuitry for maintaining the match (See, for example, U.S. Pat. No. 4,334,154). Special scanning sequences are also used wherein complicated calibrations are performed within the scan period to measure and correct the detectors on-line. These solutions each have inherent disadvantages. For examples the gaseous ionization detectors have low stopping power and therefore an increase x-ray dose is required for a given image quality. The special scanning sequence usually requires a pulsed radiation source with the consequent high priced power supply and x-ray tube. In addition special periodic calibrations are required for the detector array; which complicates the use of the system. Therefore, a relatively simple, inexpensive method of eliminating ring artifacts when using R/R equipment with unbalanced detector arrays is sorely needed.

BRIEF DESCRIPTION OF THE INVENTION

Accordingly it is an object of the present invention to provide new methods for eliminating or at least minimizing the occurence of ring artifacts in CT Scanner Images.

According to the present invention a method is presented for the correcting of ring artifacts that occur in CT derived images where the source and detector array rotate such as in R/R CT scanners, said method comprising the steps of:

a. deriving an original CT image having the ring artifacts, which is a combination of a real image and a ring artifact image caused by detector inbalances, b. determining the ring artifact image, c. subtracting the ring artifact image from the original image to obtain the real image substantially free of ring artifacts.

The inventive method contemplates obtaining the ring artifact free real image, even when there is a lack of uniformity along the circumferentral areas of the image; by following the steps of:

a. dividing the original image into sectors, b. determining the ring artifact image in each sector, and c. subtracting the ring artifact image of each sector from the original image of each sector to obtain the real image in each sector.

The inventive method further contemplates removing the ring image from an original image having non-uniformities in CT values due for example to intervening organs by:

calculating an edge enhanced image having pixel values of q(i,j) from the original image, having pixel values p(i,j) where; $q(i,j) = A \cdot p(i,j) + B \cdot av_n[p(i,j)] + C$, where A and B are constants (approximately +1 and −1 respectively); $av_n[p(i, j)]$ is the average intensity of n×n pixels centered at (i,j) and C is a constant, which may be zero.

Another feature of the invention is the use of radial sectors as divisions of concentric ring areas.

Yet another feature of the invention includes the use of a smoothing function when determining the value of the ring areas between sectors.

Still another feature of the present invention includes clipping to avoid high edge values; for example, at the outer boundaries of the image.

BRIEF DESCRIPTION OF THE DRAWING

The above mentioned and other features and objects of the present invention will become more apparent from the following description of an exemplary correction procedure related in conjunction with a single FIGURE where a CT generated image is depicted. The image is shown divided into concentric sections which are further divided into radial sectors.

GENERAL DESCRIPTION

In the drawing the image 11, generated by a rotate-rotate CT scanner is shown. To determine the value of the ring artifact portion of the image it is divided into ring defined areas such as areas Rm, Rm+1, Rm−1, etc. In practice the number of ring defined area approximates at least the number of detectors, so that the ring defined areas more closely follow the ring artifacts.

There is a lack of uniformity along the circumference of the ring artifact portions of image which makes it difficult to compute the values of the ring areas. Additional difficulties in determining the values of the ring are encountered because intervening organs have different densities or CT values. In general neither the real image nor the ring artifact image is uniform.

In accordance with a preferred method of ring artifact correction, edge enhancement of the image is accomplished as a first step to overcome the non-unformities introduced by the intervening organs. The image which is divided into picture elements or pixels, such as pixel (i,j), is shown in the drawing, as having a generally rectangular shape. For each pixel value p (i,j), an edged enhanced pixel value q(i,j) is generated according to the following equation:

$$q(i,j)=A\cdot p(i,j)+B av_n[p(i,j)]+C$$

where

A and B are constants (approximately +1 and −1, respectively);

$av_n [p (i,j)]$ is the average of n×n pixels centered at (i,j); and

C is a constant which is usually "0".

As is well known to those skilled in the art, edge enhancement causes the boundaries of the various intervening organs to be sharply defined. The edge enhanced images are characterized by large uniform area having zero values when A is +1, B is −1 and C is zero. It should be understood that this edge enhancement step could be omitted from the ring artifact correction method taught herein and the ring artifact would still be substantially reduced in most cases, although the quality of the image might also be reduced.

After edge enhancement, the enhanced image is used to define the ring artifacts. More particularly the edge enhanced image is divided into concentric ring defined areas such as areas, Rm, Rm+1, and Rm−1 shown in the FIGURE. The ring defined areas are centered about a point 12 which corresponds to the axis of rotation of the scanner.

To overcome the lack of uniformity of the ring defined areas when determing the CT values of the ring artifact image, the edge enhanced image is further divided into sectors in which the ring artifacts are more nearly uniform. The sectors preferably are radial sectors, such as sectors Sn, Sn−1 and Sn+1. In the preferred method, each pixel is assigned to a specific ring defined area sector such as (Rm,Sn) shown in the FIGURE. Different criteria may be used in assigning the pixels to ring defined area sectors; such as for example, if most of the area of a pixel is located in a particular ring defined sector the pixel would be assigned to that sector.

The value of each sector of the ring defined areas of the edge enhanced image is calculated using the following steps:

a. determining the average CT value av (Rm,Sn) of all edge enhanced pixels q (i,j) belonging to each ring defined area sector and further defined as being within threshold values T1 and T2 such that C+T1>q (i,j)>C−T2.

b. determining a ring artifact value r (R,S) for the pixels within each of the ring defined area sectors, such as the value r (Rm,Sn) for all pixels within the ring sector (Rm,Sn) by using the following algorithim:

$$r (Rm,Sn)=av (Rm,Sn)-av;$$

Where av is the average intensity of pixels q (i,j) in some defined area, such as all ring defined area sectors of the edge enhanced image that are within the threshold values T1, T2.

The thresholds are used to prevent the enhanced edges of the intervening organs from distorting the values of the ring defined areas.

As a still further feature of the invention, the correction values r(Rm,Sn) are modified to provide smooth transitions for the pixels near the borders between sectors; such as pixels near the border between sectors Sn and Sn−1. Then, the ring artifact value of these pixels near border becomes:

When the pixel is not near the border of another sector then: b (Rm)=r(Rm,Sn). It is to be understood that other smoothing algorithms could be used within the scope of this invention.

For each of the pixels of the original image p (i,j) belonging to ring defined area Rm a new pixel value $\bar{p}$ is calculated as follows:

$$\bar{p}(i,j)=p(i,j)-b(Rm)$$

The values $\bar{p}$ provide the new image substantially free of the ring artifacts.

In order to further eliminate problems arising due to high edge value such as occuring between soft tissue and bone or air the CT values of the original image can be modified prior to edge enhancement in accordance with the following equations:

$$p^* (i,j)=p(i,j) \text{ for } t_2<p(i,j)<t_2.$$

$$p^* (i,j)=t_2 \text{ for } t_2 \geq p(i,j)$$

$$p^* (i,j)=t_1 \text{ for } t_1 \leq p(i,j)$$

$$b(Rm)=r(Rm,Sn)+r(Rm,Sn-1)/2$$

where p* are the pixel values of the modified images.

Thus, new and unique methods for substantially removing ring artifacts from images are provided the methods are especially useful with R/R CT Scanners.

While the invention has been described in connection with specific methods it should be apparent that many modifications and variations can be accomplished within the scope of the invention without departing from the novel concepts and teachings of the inventor as defined in the accompanying claims.

What is claimed is:

1. A method for the correction of ring artifacts in images of an object obtained by a rotate-rotate computerized tomography (CT) scanner, said method comprising the steps of:
   (a) reconstructing an original image including ring artifacts, said original image comprising a real image without ring artifacts and a ring artifact image;
   (b) determining the ring artifact image by the steps of:
      (i) edge enhancing the original image to obtain an edge enhanced original image;
      (ii) dividing the edge enhanced original image into specified areas, said specified areas being concentric annuli which are centered about a point in the original image corresponding to the axis of rotation of the scanner;
      (iii) said step of dividing the image into concentric annuli comprising assigning each pixel of the enhanced original image to a specific one of said concentric annuli, said concentric annuli conforming to the ring artifacts;
      (iv) determining the average intensity of each concentric ring area of the said enhanced image to provide an average ring artifact pixel intensity value for each annulus;
   (c) subtracting the average ring artifact pixel intensity value of each annulus from each pixel of the original image that belongs to the same annulus to thereby obtain a ring artifact-free image.

2. The method of claim 1 including the step of modifying the original image to avoid high edge values.

3. The method of claim 2 wherein the step of modifying the original image comprises the steps of obtaining a modified image in accordance with the following equations:

$$p^*(i,j) = p(i,j) \text{ for } t2\ p(i,j)\ t1;$$

$$p^*(i,j) = t2 \text{ for } t2\ p(i,j); \text{ and}$$

$$p^*(i,j) = t1 \text{ for } t1\ p(i,j);$$

where: $p^*(i,j)$ are pixel values of the modified image, $p(i,j)$ are pixel values of the original image, and $t1$ and $t2$ are threshold values.

4. The method of claim 1 wherein the original image is divided into pixels having intensity values equal to $q(i,j)$ and wherein the edge enhancement step includes the step of:
   (a) generating values $q(i,j)$ for the pixel values $p(i,j)$ using the following equation:

$$q(i,j) = Ap(i,j) + B\ avn(p(i,j)) + C$$

where: A and B are constants, usually approximately +1 and −1 $p(i,j)$ is the original intensity value of the pixel $(i,j)$, $avn\ (p(i,j))$ is the average intensity of nxn pixels centered at $(i,j)$, $i,j$ are location determinants, n is any position integer number, and C is a constant usually equal to 0.

5. The method of claim 4 wherein the average ring artifact pixel intensity value for each ring annulus is calculated according to the following steps:
   (a) determining the average intensity $av(Rm)$ of the edge enhanced pixels, $q(i,j)$ belonging to each ring annulus that are further defined as being within threshold values such that:

$$C + T1 < q(i,j)(C - T2)$$

(b) determining ring artifact values $r(Rm)$ for the pixels within each annulus $(Rm)$ such that:

$$r(Rm) = av(Rm) - av$$

where: av is the average value of pixels having the threshold limited values, $q(i,j)$ in some defined area of the image such as the complete image, T1 and T2 are threshold values, and Rm, is a location determinant relating to ring numbers.

6. The method of claim 1 wherein the step of dividing the edge enhanced image into specified areas comprises futher dividing each of the concentric annuli into adjoining radial sectors, determining the average ring artifact intensity value for each radial sector, and subtracting the average ring artifact intensity value of each sector from each pixel of the original image belonging to the same radial sector to thereby obtain a ring artifact-free image.

7. The method of claim 6 wherein the average ring artifact pixel intensity value for each radial sector is calculated according to the following steps:
   (a) determining the average intensity $av(Rm,Sn)$ of the edge enhanced pixels, $q(i,j)$ belonging to each of said radial sectors that are further defined as being within threshold values such that:

$$C + T1 < q(i,j)(C - T2)$$

(b) determining ring artifact values $r(Rm,Sn)$ for the pixels within each of the sectors $(Rm, Sn)$ such that:

$$r(Rm,Sn) = av(Rm,Sn) - av$$

where: C is a constant usually equal to zero, av is the average value of pixels having the threshold limited to values $q(i,j)$ in some defined area of the image such as the complete image, T1 and T2 are threshold values, and Rm,Sn are location determinants relating to ring numbers and sector numbers.

8. The method of claim 6 including the steps of:
   a. obtaining correction values $r(Rm,Sn)$ for each pixel of the ring artifact image,
   b. modifying the correction values $r(Rm,Sn)$ to provide smooth changes in values when the pixel is near the border of another sector, such that the correction values becomes $$b(Rm) = r(Rm,Sn) + r(Rm,Sn-1)/2$$

9. The method of claim 8 wherein the real image free of ring artifacts is obtained from pixels $p(i,j)$ in accordance with the following equations:

$$\bar{p}(i,j) = p(i,j) - b(Rm)$$

where $p(i,j)$ defines the pixels of the original image.

10. The method of claim 6 including the step of using a smoothing function on the pixels proximate to the adjoining radial sectors.

11. The method of claim 6 including the step of modifying the original image prior to the step of edge enhancement to avoid high edge values.

* * * * *

UNITED STATES PATENT AND TRADEMARK OFFICE
CERTIFICATE OF CORRECTION

PATENT NO. : 4,670,840

DATED : June 2, 1987

INVENTOR(S) : D. FREUNDLICH

It is certified that error appears in the above-identified patent and that said Letters Patent is hereby corrected as shown below:

Column 5, lines 36-42, delete "in their entirety" and substitute:

---$p^*(i,j) = p(i,j)$ for $t_2 < p(i,j) < t_2$
$p^*(i,j) = t_2$ for $t_2 \geq p(i,j)$
$p^*(i,j) = t_1$ for $t_1 \leq p(i,j)$---

Column 6, line 1, delete and substitute ---$C+T1 > q(i,j) > (C-T2)$; and

Column 6, line 30, delete "in its entirety" and substitute therefore ---$C+T1 > q(i,j) > (C-T2)$.

Signed and Sealed this

Seventeenth Day of May, 1988

Attest:

DONALD J. QUIGG

*Attesting Officer*    *Commissioner of Patents and Trademarks*